Figure 1:
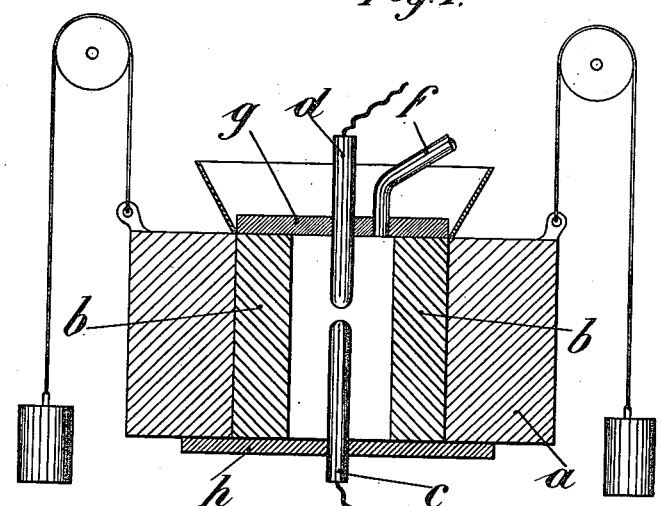

No. 870,691.  
PATENTED NOV. 12, 1907.  
H. SCHULZE.  
PROCESS OF PRODUCING POROUS BARIUM OXID.  
APPLICATION FILED OCT. 15, 1903.

Witnesses  
Jno R Adams  
Harold Kund

Inventor  
Hermann Schulze  
By Knight Bros.  
attys.

UNITED STATES PATENT OFFICE.

HERMANN SCHULZE, OF BERNBURG, GERMANY.

PROCESS OF PRODUCING POROUS BARIUM OXID.

No. 870,691.      Specification of Letters Patent.      Patented Nov. 12, 1907.

Application filed October 15, 1903. Serial No. 177,212.

*To all whom it may concern:*

Be it known that I, HERMANN SCHULZE, a subject of the German Emperor, and resident of Bernburg, Germany, have invented certain new and useful Improvements in Process of Producing Porous Barium Oxid, of which the following is a specification.

The present invention relates to an improved process of producing porous barium oxid from barium carbonate or equivalent compounds.

The essential feature of the invention consists in exposing the barium compound mixed with carbon and eventually with a compound of an alkaline earth, in a fire-proof receptacle, with the exclusion of air, to the direct or indirect action of radiant heat. The radiation of heat may be produced by one or more electric arcs or by one or more bodies brought to such temperature by electricity, as will insure application of heat to about 2,000 degrees centigrade to the mass to be treated.

The treatment of the barium compounds or barium mixtures may be illustrated as follows: Barium carbonate mixed with carbon preferably in the proportion of about 94 parts by weight of barium carbonate to 6 parts by weight of carbon is treated by the radiant heat of electric resistances, directly or indirectly and presents great advantages, as it is possible to obtain products of very fine porous structure by reason of the possibility of using temperatures of 2000 degrees centigrade and upwards. A small amount of barium nitrate may be mixed with the barium carbonate to effect a more rapid reaction, as the nitrous fumes commence to escape at low temperatures. The solid fused product (barium oxid) obtained by this process is then pulverized and mixed with barium nitrate and carbon. The proportions are preferably about 89 parts by weight of fused barium oxid, 10 parts of barium nitrate and 1 part of carbon. The application of barium nitrate serves the purpose of making the red-hot mixture porous or to swell the solid oxid portions by reason of the rapid escape of the nitrous fumes. This process is a mere technical one. The employed barium compound or barium mixture can be continuously or piece by piece put into and taken from the vessel.

The drawing illustrates two forms of construction of the apparatus required for carrying out the process.

Figure 2:
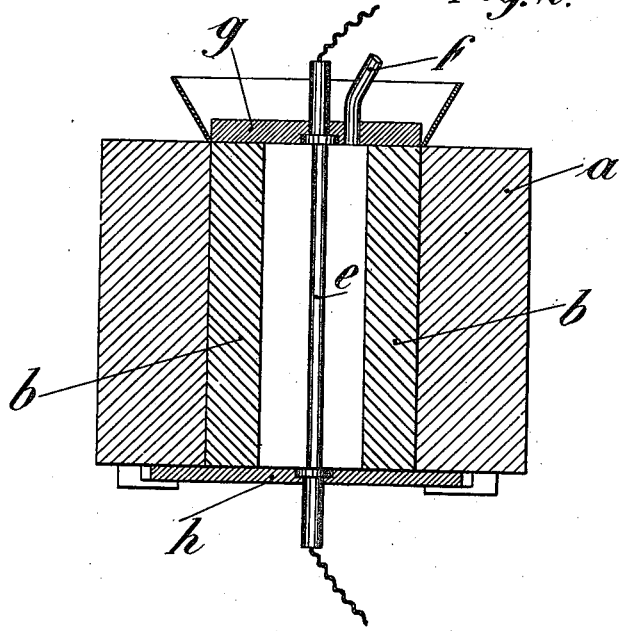

Figure 1 is a longitudinal section; and Fig. 2 is a diagrammatic view.

*a* is the vessel made of a fire-proof material, for instance chamotte or magnesia. In the form of construction shown in Fig. 1, two or more carbon electrodes *c d* project into the interior of the vessel *a* and upon sending an electric current through the electrodes, one or more electric arcs are produced while in Fig. 2 an incandescent resistance body *e* is arranged in the vessel and is connected with an electric circuit. In both cases, the heat generated by the electric current acts indirectly, that is to say, through the medium of the chamotte or magnesia walls, on the barium substance *b*, decomposes it and makes it thereby porous. The gases produced in this process pass off through a tube *f*. The electrodes or incandescent resistance bodies may be arranged around the substance. The vessel *a* can be closed by fire-proof lids *g, h*.

Having thus described my invention, what I claim as new therein and desire to secure by Letters Patent is:

1. The process of producing porous barium oxid which consists in melting barium carbonate mixed with carbon, in an electric furnace, at a temperature of about 2000° C., then again mixing it with carbon and barium nitrate and heating and inflating it in an electric furnace.

2. The process of producing porous barium oxid which consists in melting about 94 parts by weight of barium carbonate mixed with about 6 parts by weight of carbon, in an electric furnace, then mixing about 89 parts by weight of the product thus obtained with about 10 parts of barium nitrate and 1 part of carbon and heating and thereby inflating the mixture in an electric furnace.

The foregoing specification signed at Berlin this fifth day of October, 1903.

HERMANN SCHULZE.

In presence of—
     HENRY HASPER,
     WOLDEMAR HAUPT.